United States Patent [19]

Whewell

[11] Patent Number: 5,234,474

[45] Date of Patent: Aug. 10, 1993

[54] FUEL COMPOSITIONS COMPRISING FULLERENES

[76] Inventor: Christopher J. Whewell, 11631 Lyman Rd., Chesterland, Ohio 44026-1825

[21] Appl. No.: 717,648

[22] Filed: Jun. 19, 1991

[51] Int. Cl.$^5$ .......................... C10L 1/22; C10L 1/00
[52] U.S. Cl. ........................ 44/282; 44/418; 44/412; 44/628
[58] Field of Search ............... 44/282, 418, 412, 628

[56] References Cited

U.S. PATENT DOCUMENTS

| | | | |
|---|---|---|---|
| 2,896,593 | 7/1959 | Riemenschnelder | 123/1 A |
| 3,004,837 | 10/1961 | Riemenschnelder | 44/443 |
| 3,753,905 | 8/1973 | Souillard | 252/33.4 |
| 3,969,233 | 7/1976 | Lucas | 252/29 |
| 4,358,292 | 11/1982 | Battista | 44/282 |
| 4,425,138 | 1/1984 | Davis | 44/58 |
| 4,663,063 | 5/1987 | Davis | 252/51.5 R |
| 4,708,809 | 11/1987 | Davis | 252/33.4 |
| 4,724,091 | 2/2988 | Davis | 252/33.4 |
| 4,740,321 | 4/1988 | Davis | 252/33.4 |

FOREIGN PATENT DOCUMENTS 2461743 2/1981 France.

OTHER PUBLICATIONS

Bae, et al, "Production of . . . Carbon Clusters," from Symposium on Clusters, delivered Nov. 29, 1990, Boston, Mass.

Cox et al., "Characterization of $C_{60}$ and $C_{70}$ clusters," J. Am. Chem. Society, Apr. 10, 1991.

Primary Examiner—Jacqueline V. Howard
Attorney, Agent, or Firm—Christopher Whewell

[57] ABSTRACT

Fuel compositions for internal combustion engines and more particularly, fuel compositions for 2-cycle internal combustion engines comprising a gasoline, a hydrocarbon-soluble allotropic form of carbon, and a dispersing agent are provided. Engines operated utilizing the fuel compositions provided produce considerably lessened amounts of undesirable exhaust gas emmissions.

20 Claims, No Drawings

FUEL COMPOSITIONS COMPRISING FULLERENES

BACKGROUND OF THE INVENTION

This invention relates to fuel compositions for internal combustion engines and more particularly to fuel compositions which are characterized as containing a lubricant. The compositions disclosed herein are especially suitable for operating two-cycle combustion engines.

It is an ongoing goal of the world's automotive industries to continuously develop more efficient combustion engines which at the same time release decreased levels of undesirable gaseous emissions during their operation. The most common type of combustion engine presently in popular usage is the four-cycle engine. During normal operation four strokes or motions of the piston and connecting rod assembly in the cylinder bore comprise one complete engine cycle. These strokes are: 1) fuel-air intake stroke, 2) compression stroke, 3) power stroke, and 4) exhaust stroke. This cycle is repeated over and over at a constant or varied rpm in order to provide a useful work output. One of the drawbacks of the four-cycle engine is that only one power stroke occurs during every two revolutions of the crankshaft to which the piston and its connecting rod are attached.

Two-cycle engines, on the other hand produce one power stroke for every one revolution of the crankshaft. Typical operation is as follows: On the upstroke of the piston a partial vacuum is created in the crankcase and the piston is simultaneously caused to uncover a fuel mixture inlet port forcing the fuel mixture to enter the crankcase. This occurs while the charge currently in the cylinder is being compressed. The compressed charge is then fired and the piston decends on its power stroke, compressing the mixture in the crankcase. At the bottom of the power stroke, the piston uncovers the exhaust port(s) and fuel transfer ports. The exhaust gasses exit the engine while fresh fuel mixture is admitted to the cylinder. The cycle then repeats.

For two cycle engines conventional fuel mixtures comprise a gasoline and a gasoline-soluble lubricating additive such as a petroleum oil in a ratio of about 16 parts gasoline to 1 part of lubricating additive. Several different lubricating additives are available under the name of "2-cycle engine oil". The main requirement of such an oil is to provide sufficient lubrication of the moving engine components so as to avoid engine seizure and undue wear while preventing build-up of carbon deposits in the combustion chamber. From a manufacturing standpoint, an advantage of using a fuel/lubricant mixture is that no oil flow passages must be cast in or machined in the engine block and that no oil recirculating system or pump is required. Therefore the cost of manufacturing two cycle engines is considerably less when compared to four-cycle engines. Also, since the engine delivers one power stroke per engine revolution using fewer moving parts, greater power is produced with relatively less cost and less pollution.

The major disadvantage of combusting fuel/lubricant mixtures and the main reason why these types of engines do not enjoy the same popularity as their four-stroke counterparts is that the amount of unburned hydrocarbons, carbon monoxide, or nitrogen oxides emmitted during their operation is too great for the current emmission standards maximum levels imposed by the US EPA and other similar organizations worldwide even when state-of-the-art catalytic convertors are utilized. Obviously if it were possible to reduce the quantity of undesirable emissions while maintaining sufficient lubrication for normal engine operation then the automotive industries and society as a whole would benefit greatly.

SUMMARY OF THE INVENTION

In accordance with the present invention, the problems associated with the high amounts of undesirable exhaust gas emissions of two-cycle engines operated using conventional fuel mixtures are greatly reduced. This is accomplished by partial or complete substitution of the lubricating component of a conventional or prior art two-cycle engine fuel composition by a hydrocarbon-soluble fullerite species. is used in this specification and the appended claims the term "fullerite" denotes one or more hydrocarbon-soluble or dispersible allotrope(s) of elemental carbon which may exist in the general form of a closed spheroidal cage structure comprising truncated icosahedra including those allotropes which contain 60, 70, and 84 carbon atoms. For example, the simplist fullerite contains 60 carbon atoms, and such a material is described in the publication "Nature", vol. 318, page 162. Other similar carbon allotropés which exist in a cage structure are also possible, and allotropes containing 70, and 84 carbon atoms have also been described (Nature, vol. 350, page 20). A material which is to be considered representative of fullerite for purposes of the present invention is obtained by electrically evaporating carbon electrodes in an inert atmosphere such as helium at a pressure of about 100 torr. The 60 and 70 carbon atom fullerites are believed to comprise over 90% of the total hydrocarbon-soluble residue so produced. It is presumed that fullerite produced by some other means than described herein is also suitable for the present invention, provided that it imparts the same lubricating quality to the gasolines employed.

I have found that when the hydrocarbon-soluble portion of the material obtained by electrically evaporating graphite electrodes in a helium atmosphere at about 100 torr of pressure (fullerite) is dissolved in commercially available gasoline, that in addition to changing its color of the gasoline, the fullerite imparts a heretofore unobserved lubricating quality to the gasoline. It was subsequently found that a two-cycle engine suffered no increased wear and appeared to function normally when a significant portion of the conventional lubricative component of its fuel was removed and replaced by the fullerite. While the engine was operated the levels of undesirable exhaust gas components emitted were reduced and the normal blue smoke and odor which is characteristic of a two-cycle engine during its operation was not observed.

Accordingly, an object of the present invention is to provide a fuel composition which allows for reduced exhaust emmisions of two cycle engines during their normal operation.

DESCRIPTION OF THE INVENTION

The fuels contemplated for use in the fuel compositions of the present invention are normally liquid hydrocarbon fuels in the gasoline boiling range, including hydrocarbon base fuels. The term "petroleum distillate fuel" also is used to describe the fuels which can be utilized in the fuel compositions of the present invention and which have the above characteristic boiling points. The term is, however, not intended to be restricted to straight-run distillate fractions. The distillate fuel can be straight-run distillate fuel, catalytically or thermally cracked (including hydrocracked) distillate fuel, or a mixture of straight-run distillate fuel, naphthas and the like with cracked distillate stocks. Also, the base fuels used in the formation of the fuel compositions of the present invention can be treated in accordance with well-known commercial methods such as acid or caustic treatments, hydrogen solvent refining, clay treatment, etc.

Gasolines are supplied in a number of different grades depending upon the type of service for which they are intended. The gasolines utilized in the present invention include those designed as motor and avation gasolines. Motor gasolines include those defined by ASTM specification D-439-73 and are composed of a mixture of various types of hydrocarbons including aromatics, olefins, parafins, isoparafins, naphthalenes, and occasionally diolefins. Motor gasolines normally have a boiling range within the limits of about 20 degrees C. to about 230 degrees C., while avation gasolines have narrower boiling ranges, usually within the limits of about 37 degrees C. to 165 degrees C.

The Fullerite Containing Fuel Composition

The fuel compositions of the present invention will contain elemental carbon in one of its fullerite forms or a mixture of two or more fullerites. The currently preferable form of fullerite for use in the fuel compositions of the present invention is the hydrocarbon-soluble portion of the material obtained when graphite electrodes are electrically evaporated in an inert atmosphere such as helium. The mixture of fullerites obtained in this process is presently believed to principally comprise primarily the C-60 and C-70 structures, and it is also presently believed that it is these species which impart the lubricative characteristics to the fuel compositions of the present invention.

The C-60 and C-70 fullerite allotropes are separable using chromatographic methods, but such procedures will add to the cost of the fuel compositions of the present invention. Since no obvious deleterious effects were observed when the mixture of allotropes was utilized, there is presently no reason for separating these species and excluding one or the other from the fuel compositions.

Since gasolines vary from refiner to refiner with respect to such components as total aromatic content, oxygenate content, additive content, etc., it may be necessary in some cases to include in the fuel compositions polymeric dispersants which would tend to assist in keeping the fullerites in solution or in increasing the solubility of the fullerites in a given gasoline. A large number of polymeric dispersants have been suggested as being useful in lubricating oil formulations, and such polymeric dispersants are useful in the fuel compositions of the present invention. Often, such additives have been described as being useful in lubricating formulations as viscosity index improvers with dispersing characteristics. The polymeric dispersants are generally polymers or copolymers having a long carbon chain and containing polar groups to impart the dispersancy characteristics. Polar groups which are useful in this regard include amines, imines, imides, hydroxyl, etc. For example, the polymeric dispersants may be copolymers of methacrylates or acrylates containing additional polar groups or vinyl acetatefumaric acid ester copolymers.

Many such polymeric dispersants have been described in prior art. The following are U.S. patents which described polymeric dispersants: U.S. Pat. Nos. 4,402,844, 3,356,763, and 3,891,721. Other polymers which may be useful as dispersants in the fuels in this invention are described in the following U.S. Pat. Nos. 3,687,849, 3,687,905, 4,476,283, 4,181,618, 3,243,481, 3,723,575, 3,475,514, 4,026,167, 4,085,055, 4,409,120, 4,077,893, 4,358,565, 4,141,847, 4,346,193, and 4,160,739. Essential material contained in these patents is herein incorporated by reference. U.S. Pat. No. 4,402,844 describes nitrogen-containing copolymers prepared by the reaction of lithiated hydrogenated conjugated dienemonovinylarene copolymers with substituted aminolactams. U.S. Pat. No. 3,356,763 describes a process for producing block copolymers of dienes such as 1,3-butadiene and vinyl aromatic hydrocarbons such as ethyl styrenes. U.S. Pat. No. 3,891,721 describes block polymers of styrene-butadiene-2-vinylpyridine. A number of polymeric dispersants may be prepared by grafting polar monomers to polyolefinic backbones. For example, U.S. Pat. Nos. 3,687,849 and 3,687,905 describe the use of maleic anhydrides as a graft monomer to a polyolefinic backbone. Maleic acid or anhydride is widely used as a graft monomer because of its low cost and its role of providing incorporation of dispersant nitrogen compounds into polymers by further reaction of the carboxyl groups of the maleic acid or anhydride with, for example, nitrogen compounds or hydroxy compounds. U.S. Pat. No. 4,160,739 describes graft copolymers obtained by the grafting of a monomer system comprising maleic acid or anhydride and at least one other different monomer which is addition copolymerizable therewith, the grafted monomer system then being post-reacted with a poly-amine. The monomers which are copolymerizable with maleic acid or anhydride are any alpha, beta-monoethylenically unsaturated monomers which are sufficiently soluble in the reaction medium and are reactive towards maleic acid or anhydride so that substantially larger amounts of maleic acid or anhydride can be incorporated into the grafted polymeric product. Suitable monomers include esters, amides and nitriles of acrylic and methacrylic acid, and no monomers containing no free acid groups. The inclusion of heterocyclic monomers into graft polymers is described by a process which comprises a first step of graft polymerizing an alkyl ester of acrylic acid or methacrylic acid, alone or in combination with styrene, onto a backbone copolymer which is a hydrogenated block copolymer of styrene and a conjugated diene having 4 to 6 carbon atoms to form a first graft copolymer. In the second step, a polymerizable heterocyclic monomer, alone or in combination with a hydrophobizing vinyl ester is copolymerized onto the first graft copolymer to form a second graft copolymer.

The hydrocarbon-substituted phenolic dispersants useful in the fuel compositions of the present invention include the hydrocarbon-substituted phenolic compounds wherein the hydrocarbon substituents have a molecular weight which is sufficient to render the phenolic compound fuel-soluble. Generally, the hydrocarbon substituent will be a substantially saturated, hydrocarbon based group of at least about 30 carbon atoms.

Also useful in the fuel compositions of the present invention are fuel-soluble alkoxylated derivatives of alcohols, phenols, and amines. A wide variety of such derivatives can be utilized so long as the derivatives are soluble in the fuel employed. As is well known to those skilled in the art, the solubility characteristics of the alkoxylated derivatives of phenols, alcohols, and amines can be controlled by proper selection of molecular moieties. Examples of commercially available alkylene oxide derivatives which may be used as dispersants in the fuel compositions of present invention are: Ethomeen S/12, tertiary amines of ethylene oxide condensation products of the primary fatty amines (Armak Industries), and Plurafac A-24, an ethoxylated straight chain alcohol available from BASF Wyandotte Industries.

A number of acylated, nitrogen-containing compounds having a substituent of at least 10 aliphatic carbon atoms and made by reacting a carboxylic acid acylating agent with an amino compound are known to those skilled in the art. In such compositions the acylating agent is bonded to the amino compound through an imido, amido, amidine, or acyloxy ammonium linkage. The substituent of 10 aliphatic carbon atoms may be in either the carboxylic acid acylating agent derived portion of the molecule or in the amino compound derived portion of the molecule. The acylating agent can vary from formic acid and its acylating derivatives to acylating agents having high molecular weight substituents of up to 20,000 carbon atoms. The amino compounds can vary from ammonia itself to amines having aliphatic substituents of up to about 30 carbon atoms.

In cases where the fuel compositions of the present invention are to be exposed to ultraviolet light for any extended time, additives such as ultraviolet light absorbers (UVA) or hindered amine light stabilizers (HALS) may function to retard any reaction between the fullerite and the components of the gasoline. Again, this will depend upon the relative amounts of various components present in the gasoline used in the fuel composition. Examples of hindered amine light stabilizers are: 1) Dimethyl succinate polymer with 4-hydroxy-2,2,6,6-tetramethyl-1-piperidine ethanol, and 2) N,N'-bis(2,2,6,6,-tetramethyl-4-piperidinyl)-1,6-hexanediamine polymer with 2,4,6-trichloro-1,3,5-triazine and 2,4,4-trimethyl-1,2-pentamine. An example of a UV absorber is 2-Hydroxy-4-n-octyloxy benzophenone.

The fuel compositions of the present invention can be prepared by either adding the individual components to a liquid hydrocarbon fuel, or a concentrate can be prepared comprising the components either pure or in a hydrocarbon diluent such as mineral oil. The following examples illustrate the fuel compositions in accordance with the present invention.

EXAMPLE 1

Unleaded gasoline is caused to remain in contact with fullerite until saturated with the fullerite. Then a volume of fresh unleaded gasoline equal to 5% by volume of the original amount of unleaded gasoline is added to the fullerite-containing gasoline. This fullerite-containing gasoline (which is nearly saturated with the fullerite) is then blended with SAE 5W-30 motor oil in a volume to volume ratio of 50 parts of the gasoline to 1 part motor oil to produce a two-cycle engine fuel composition.

EXAMPLE 2

To the fuel composition of example 1 is added about 0.5% by weight of a hindered amine light stabilizer.

In addition to the additives of this invention, the use of other conventional fuel additives is contemplated. Thus the fuel compositions may also contain surface ignition suppressants, demulsifiers, dyes, gum inhibitors, oxidation inhibitors, etc.

The present invention is generally directed to fuel compositions, but in particular to fuel compositions for two-cycle internal combustion engines. While fuel compositions of the present invention (which are preferably unleaded gasolines) are intended to be burned in internal combustion engines, the fuel compositions of the present invention have also been found to function as multi-purpose lubricants.

What is claimed is:

1. A fuel composition comprising gasoline and at least one hydrocarbon-soluble allotrope of elemental carbon wherein said allotrope is present in an effective lubricating amount.

2. The fuel composition of claim 1 wherein said carbon allotrope comprises a fullerite or a mixture of fullerites.

3. The fuel composition of claim 1 containing a hydrocarbon-soluble ashless dispersant.

4. The fuel composition of claim 1 which is substantially free of phosphorous.

5. The fuel composition of claim 1 containing about 0.5 grams per liter or less of lead.

6. The fuel composition of claim 1 containing about 1 part (by volume) or less of conventional two-cycle engine oil additive per 16 volumes of gasoline.

7. A fuel composition comprising gasoline, a conventional two-cycle engine oil, and at least one hydrocarbon-soluble allotrope of elemental carbon wherein said allotrope is present in an effective lubricating amount.

8. The fuel composition of claim 7 wherein said carbon allotrope comprises a fullerite or a mixture of fullerites.

9. The fuel composition of claim 7 containing a hydrocarbon-soluble ashless dispersant.

10. The fuel composition of claim 7 which is substantially free of phosphorous.

11. The fuel composition of claim 7 containing about 0.5 grams per liter or less of lead.

12. The fuel composition of claim 7 containing about 1 part (by volume) or less of conventional two-cycle engine oil additive per 16 volumes of gasoline.

13. The fuel composition of claim 9 wherein the dispersant is selected from the group consisting of:
i) at least one hydrocarbyl-substituted amine where the hydrocarbyl substituent is substantially aliphatic and contains at least 6 carbon atoms;
ii) at least one acylated, nitrogen-containing compound having a substituent of at least 10 aliphatic carbon atoms made by reacting a carboxylic acid acylating agent with at least one amino compound and $$-\underset{H}{\overset{|}{N}}-$$

group, said acylating agent being linked to said amino compound through an imido, amido, amidine, or acyloxy ammonium linkage;
iii) at least one nitrogen-containing condensate of a phenol, aldehyde, and amino compound having at least one

group;
iv) at least one ester of a substituted carboxylic acid;
v) at least one polymeric dispersant;
vi) at least one hydrocarbon substituted phenolic dispersant;
vii) at least one fuel-soluble alkoxylated derivative of an alcohol, phenol, or amine.

14. The fuel composition of claim 13 (ii) wherein the amino compound is an alkylene polyamine of the general formula:

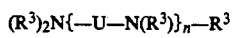

wherein U is an alkylene group of about 1 to 18 carbon atoms, each $R^3$ is independently a hydrogen atom, an alkyl group, or a hydroxy alkyl group containing up to about 30 carbon atoms, with the proviso that at least one R group is a hydrogen atom, and n is equal to about 1 to 10.

15. The process of operating an internal combustion engine by introducing into the combustion chamber a mixture comprising a gasoline and a fullerite or a mixture of fullerites wherein said fullerite is present in an effective lubricating amount.

16. The process of operating an internal combustion engine by introducing into the combustion chamber a mixture comprising gasoline, a fullerite or mixture of fullerites, and a hydrocarbon-soluble ashless dispersant wherein said fullerite is present in an effective lubricating amount.

17. A concentrate for use in preparing a fuel comprising a fullerite and a hydrocarbon-soluble ashless dispersant wherein said allotrope is present in an effective lubricating amount.

18. The concentrate of claim 17 additionally containing a hydrocarbon solvent or diluent.

19. The concentrate of claim 17 wherein said fullerite comprises an allotrope of carbon whose molecular structure contains 60 carbon atoms arranged in the shape of a truncated icosahedron.

20. The concentrate of claim 17 wherein said fullerite comprises an allotrope of carbon whose molecular structure contains 70 carbon atoms arranged in the shape of a truncated icosahedron.

* * * * *